(12) United States Patent
Nakamura et al.

(10) Patent No.: US 10,962,085 B2
(45) Date of Patent: Mar. 30, 2021

(54) TORSIONAL VIBRATION DAMPER

(71) Applicant: TOYOTA JIDOSHA KABUSHIKI KAISHA, Toyota (JP)

(72) Inventors: Taiki Nakamura, Susono (JP); Hiroyuki Amano, Susono (JP); Hideyuki Nishida, Susono (JP); Yuya Takahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 15/939,239

(22) Filed: Mar. 28, 2018

(65) Prior Publication Data

US 2018/0283490 A1    Oct. 4, 2018

(30) Foreign Application Priority Data

Mar. 29, 2017  (JP) .............................. JP2017-064938

(51) Int. Cl.
*F16F 15/139* (2006.01)
*F16F 15/14* (2006.01)
(Continued)

(52) U.S. Cl.
CPC ...... *F16F 15/1392* (2013.01); *F16F 15/1343* (2013.01); *F16F 15/1478* (2013.01); *F16F 15/22* (2013.01); *F16H 1/2863* (2013.01); *F16H 57/0479* (2013.01); *F16H 57/082* (2013.01); *F05D 2260/4031* (2013.01);
(Continued)

(58) Field of Classification Search
CPC ............... F16F 15/1392; F16F 15/1478; F16F 15/1343; F16F 15/22; F16F 2222/08; F16F 15/1333; F16F 15/134; F16H 1/2863; F16H 57/0479; F16H 57/082; F16H 2001/2872;
(Continued)

(56) References Cited

U.S. PATENT DOCUMENTS 2,591,743 A * 4/1952 Thompson .......... F16H 57/0471
  475/346
5,766,109 A * 6/1998 Sudau ................. F16F 15/1343
  475/347
(Continued)

FOREIGN PATENT DOCUMENTS

JP    2016-169852 A    9/2016
WO   2016104783 A1    6/2016

*Primary Examiner* — Greg Binda
(74) *Attorney, Agent, or Firm* — Hunton Andrews Kurth LLP

(57) ABSTRACT

A torsional vibration damper includes a planetary rotary unit and an elastic body that couples two rotary elements of three rotary elements so that the two rotary elements can rotate relatively to each other. The torsional vibration damper includes a shaft supporting member by which a rotation center axis of at least any one rotary element of the two rotary elements and a rotation center axis of the rotary element other than the planetary rotary unit and the two rotary elements are held on the same axis. The shaft supporting member has a holding section that is disposed in a position between fellow planetary rotary elements and not making contact with the planetary rotary elements and that fits with and thereby suppresses movement of the rotary element other than the planetary rotary unit and the two rotary elements in the axial direction.

6 Claims, 16 Drawing Sheets

(51) Int. Cl.
  *F16F 15/134* (2006.01)
  *F16F 15/22* (2006.01)
  *F16H 1/28* (2006.01)
  *F16H 57/04* (2010.01)
  *F16H 57/08* (2006.01)
  *F16H 45/02* (2006.01)

(52) U.S. Cl.
  CPC .. *F16F 2222/08* (2013.01); *F16H 2001/2872* (2013.01); *F16H 2045/0226* (2013.01); *Y10T 74/2131* (2015.01)

(58) Field of Classification Search
  CPC ......... F16H 2045/0226; Y10T 74/2131; F05D 2260/4031
  USPC ...... 464/67.1, 68.1, 109; 74/574.4; 475/201, 475/253, 346, 347
  See application file for complete search history.

(56) References Cited

U.S. PATENT DOCUMENTS

| | | | |
|---|---|---|---|
| 8,672,802 B2* | 3/2014 | Hwang | F16F 15/13157 475/347 |
| 10,718,401 B2* | 7/2020 | Yoshikawa | F16F 15/12353 |
| 2017/0261065 A1 | 9/2017 | Yoshikawa et al. | |
| 2018/0259034 A1* | 9/2018 | Takahashi | F16F 15/12353 |

* cited by examiner

TORSIONAL VIBRATION DAMPER

CROSS-REFERENCE TO RELATED APPLICATIONS

The present disclosure claims the benefit of Japanese Patent Application No. 2017-064938 filed on Mar. 29, 2017 with the Japanese Patent Office, the disclosure of which are incorporated herein by reference in its entirety.

BACKGROUND

Field of the Disclosure

Embodiments of the present disclosure relate generally to the art of a torsional vibration damper configured so as to reduce a torsional vibration resulting from pulsation of an input torque.

Discussion of the Related Art

An example of a planetary gear unit being used as a damper for reducing a torsional vibration is described in JP-A-2016-169852. In the configuration described in JP-A-2016-169852, a ring gear and a carrier are coupled via a spring damper so as to be able to rotate relatively to each other by a certain angle. The ring gear and a prime mover are configured so as to enable a torque to be transmitted on an input side member of the spring damper, and the carrier and a drive object are configured so as to enable a torque to be transmitted on an output side member of the spring damper. A spring of the spring damper is disposed on an inner side of the sun gear in a radial direction of the planetary gear unit, and a guide bearing that supports the sun gear in a rotatable manner is disposed between fellow springs adjacent in a circumferential direction. When a torque inputted from the prime mover fluctuates, the spring of the spring damper elongates and contracts, and the ring gear and the carrier rotate relatively to each other by a certain angle. Accordingly, pinion gears held in a rotatable manner in the carrier rotate within a certain angle range. In addition, the sun gear is forcibly rotated. An inertia torque of the carrier acts as a resistance to the fluctuation of the torque inputted from the prime mover, and the fluctuation of torque outputted from the planetary gear unit is reduced.

In the damper described in JP-A-2016-169852, due to the guide bearing being provided between fellow springs adjacent in the circumferential direction on an inner radial side of the sun gear as an externally toothed gear, a space on the inner radial side of the sun gear narrows. Thus, restrictions are applied to sizes of the guide bearing or spring. Moreover, because there is no member to suppress displacement in the axial direction of the sun gear, there is a possibility that when, for example, the sun gear is displaced in the axial direction due to the fluctuation of the torque inputted from the prime mover, a clearance between the pinion gear and the sun gear in the planetary gear unit increases, and a tooth striking noise or a vibration resulting from the tooth striking noise is generated. Accordingly, although displacement of the sun gear in the axial direction can be suppressed if it is attempted to suppress displacement of the sun gear in the axial direction by, for example, a snap ring or the like, there is a possibility that rotation of the sun gear is hindered by a sliding resistance due to a side surface of the sun gear and the snap ring coming into contact. As a result, the inertia torque is reduced whereby vibration-reducing performance ends up being lowered, leaving room for improvement as a vibration reducer.

SUMMARY

Aspects of the present disclosure have been conceived noting the foregoing technical problems, and it is therefore an object of the present disclosure to provide a torsional vibration damper in which a rotary element serving as an inertia mass body can be smoothly rotated (oscillated) without increasing the size of the torsional vibration damper.

The present disclosure relates to a torsional vibration damper. The torsional vibration damper includes a planetary rotary unit having a first rotary element, a second rotary element disposed concentrically to the first rotary element, a plurality of planetary rotary elements disposed between the first rotary element and the second rotary element in a radial direction of the first rotary element and engaging with at least any one of the first rotary element and the second rotary element, and a third rotary element holding the planetary rotary elements in a rotatable manner. The torsional vibration damper also includes an elastic body coupling any two rotary elements of the first rotary element, the second rotary element, and the third rotary element so that the two rotary elements can rotate relatively to each other by a certain angle. The torsional vibration damper is configured so that torque is applied to the two rotary elements, and so that due to a pulsation of the torque, the elastic body is elastically deformed whereby a relative rotation of the two rotary elements occurs. The planetary rotary elements make a reciprocating movement in a circumferential direction by an angle based on the pulsation of the torque. A a pulsation occurs in rotation of the rotary element other than the planetary rotary elements and the two rotary elements. A shaft supporting member is provided by which a rotation center axis of at least any one rotary element of the two rotary elements and a rotation center axis of the rotary element other than the planetary rotary elements and the two rotary elements are held on the same axis. The shaft supporting member is disposed in a position between fellow planetary rotary elements and does not make contact with the planetary rotary elements when the planetary rotary elements make a reciprocating movement in the circumferential direction due to the pulsation of the torque. The shaft supporting member has a holding section that fits with the rotary element other than the planetary rotary elements and the two rotary elements so as to suppress movement of the rotary element other than the planetary rotary elements and the two rotary elements in an axial direction with respect to the at least any one rotary element of the two rotary elements.

In a non-limiting embodiment, the rotary element other than the planetary rotary elements and the two rotary elements may serve as the first rotary element. The two rotary elements may serve as the second rotary element and the third rotary element, and the shaft supporting member may be provided to the third rotary element.

In a non-limiting embodiment, the holding section may be configured so as to fit with the first rotary element from both sides in the axial direction. A first gap between the holding section and the first rotary element in the axial direction may be narrower than a second gap between the holding section and the third rotary element in the axial direction.

In a non-limiting embodiment, the planetary rotary unit may be configured by a planetary gear unit including a sun gear, a ring gear disposed concentrically to the sun gear. A carrier that holds a plurality of pinion gears engages with the sun gear and the ring gear. One of the of the sun gear and the ring gear may serve as the first rotary element, the carrier may serve as the third rotary element, and other one of the sun gear and the ring gear, and the carrier may serve as the two rotary elements.

In a non-limiting embodiment, the holding section may be configured so as to fit from both sides in the axial direction.

In a non-limiting embodiment, the sun gear may serve as the first rotary element, the ring gear may serve as the other gear, the shaft supporting member may be provided to the carrier, a mass increasing section that increases an inertia mass of the sun gear may be provided integrally with the sun gear in a position between fellow planetary rotary elements and does not make contact with the planetary rotary elements when the planetary rotary elements make a reciprocating movement in the circumferential direction due to the pulsation of the torque. The holding section may be configured so as to fit with the mass increasing section.

Due to the embodiments of the present disclosure, a torque is applied to two rotary elements from among a first rotary element, a second rotary element, and a third rotary element of a planetary rotary unit, and the two rotary elements are coupled so as to be capable of rotating relatively to each other, by an elastic body. When the elastic body is elastically deformed by a cyclical fluctuation, that is, a pulsation of the torque, relative rotation occurs between the two rotary elements, whereby planetary rotary elements make a reciprocating movement (oscillate) within a certain angle range. The rotary element other than the planetary rotary elements and the two rotary elements rotates due to the relative rotation between the two rotary elements accompanying the pulsation of the torque. Since rotation of the rotary element other than the planetary rotary elements and the two rotary elements is due to the torque pulse, a pulsation occurs in that rotation. That is, the rotary element other than the planetary rotary elements and the two rotary elements serves as an inertia mass body. Moreover, a remaining angle range in which the planetary rotary elements do not make a reciprocating movement is configured as a non-operational region, and this non-operational region has disposed therein a shaft supporting member by which a rotation center axis of one rotary element of the two rotary elements and a rotation center axis of the rotary element other than the planetary rotary elements and the two rotary elements that serves as the inertia mass body are held on the same axis. Therefore, an increase in size of the damper due to providing the shaft supporting member can be suppressed, and an installation space overall can be reduced. Moreover, the shaft supporting member includes a holding section, and the holding section fits with and thereby suppresses movement in the axial direction of the rotary element other than the planetary rotary elements and the two rotary elements that serves as the inertia mass body. As a result of the above, each of the rotation center axes of the first rotary element, the second rotary element, and the third rotary element of the planetary rotary unit can be held on substantially the same axis by the pulsation of the torque. As a result, the rotary element other than the planetary rotary elements and the two rotary elements that serves as the inertia mass body rotates smoothly to generate an inertia torque based on its mass. That inertia torque acts as a resistance to the pulsation of the torque, and a torque fluctuation is reduced. Thus, in the present disclosure, rotation (oscillation) of the rotary element other than the planetary rotary elements and the two rotary elements that serves as the inertia mass body is smooth, thereby enabling an anticipated vibration-reducing performance to be obtained.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

First Embodiment

Figure 1:
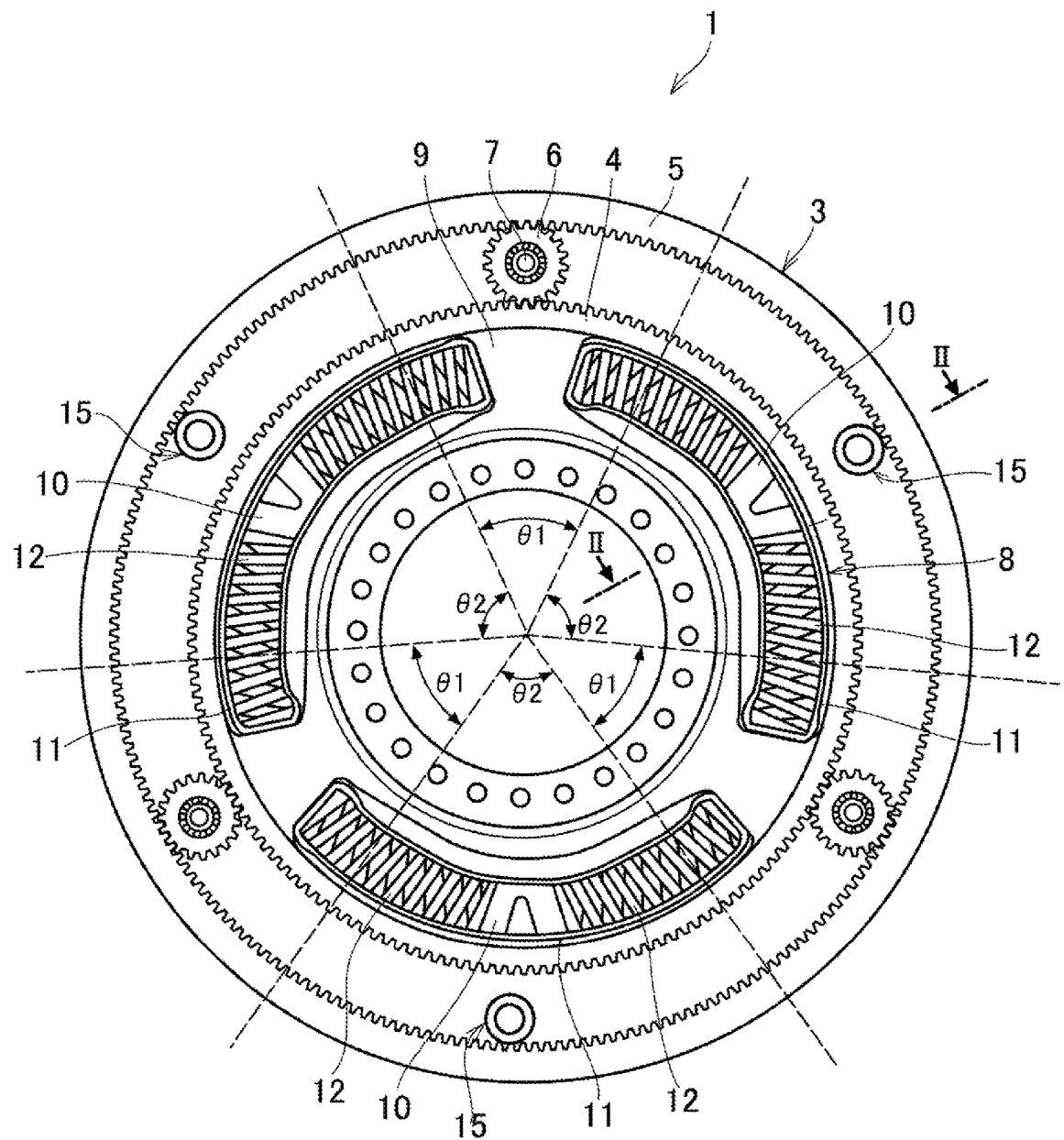
FIG. 1 is a front view schematically showing one example of the torsional vibration damper according to the first embodiment of the present disclosure.
Figure 2:
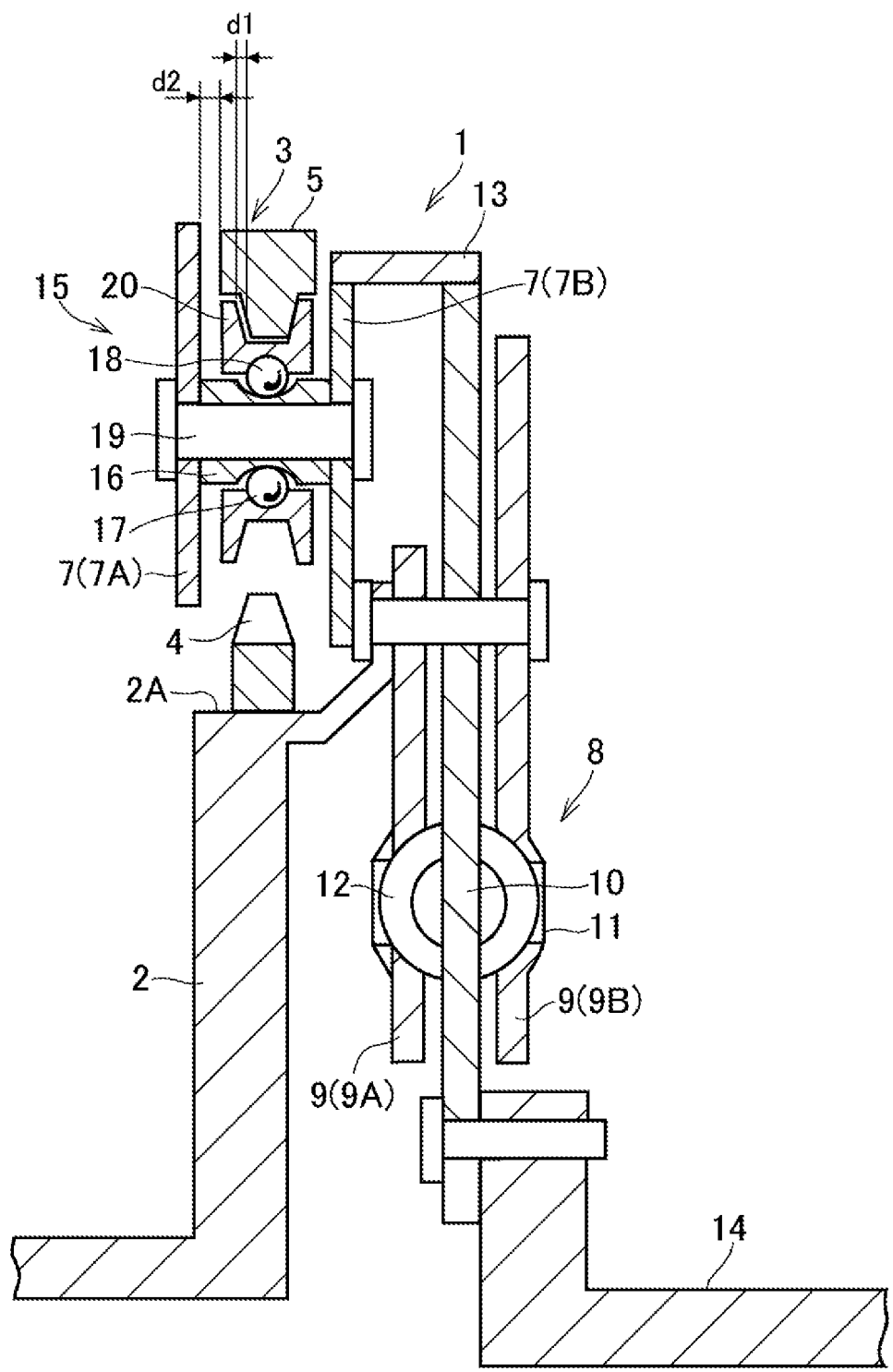
FIG. 2 is a cross-sectional view taken along the II-II line of FIG. 1 looking in the direction of the arrows.

Next, the present disclosure will be described based on embodiments. A torsional vibration damper according to a first embodiment of the present disclosure is provided in a transmission path of a torque between an unillustrated prime mover and an unillustrated drive object and is configured so as to reduce a pulsation of the torque transmitted from the prime mover to the drive object. The prime mover is, for example, an internal combustion engine, hence, an output torque of the prime mover pulsates inevitably. The drive object is, for example, a transmission, and may be a conventionally known transmission such as a geared transmission where a speed ratio changes in steps or a continuously variable transmission where a speed ratio changes continuously. FIG. 1 is a front view schematically showing one example of the torsional vibration damper according to the first embodiment of the present disclosure, and FIG. 2 is a cross-sectional view taken along the II-II line of FIG. 1 looking in the direction of the arrows. A torsional vibration damper 1 includes a planetary rotary unit 3 coupled to an output side of the prime mover via a first coupling member 2 so that an output torque of the prime mover is transmitted the planetary rotary unit 3. The first coupling member 2 is formed in a disk shape in the example shown in FIG. 2, and the planetary gear unit 3 is disposed concentrically on an outer side of the first coupling member 2 in a radial direction of the torsional vibration damper 1. Note that in FIG. 1, depiction of the first coupling member 2 is omitted to simplify the drawing.

The planetary rotary unit 3 may be a unit that performs a differential action by three rotary elements of the likes of a planetary gear unit or planetary roller unit, and in the example shown here is configured by a single-pinion planetary gear unit. The planetary gear unit 3 includes: a sun gear 4; a ring gear 5 disposed concentrically to the sun gear 4; and a carrier 7 that supports in a rotatable manner a plurality of pinion gears 6 that engage with the sun gear 4 and the ring gear 5. The sun gear 4 is formed on an outer peripheral surface 2A of the first coupling member 2. The carrier 7 is configured by a pair of ring-shaped carrier plates 7A, 7B disposed on both sides of the pinion gears 6 in a rotation center axial direction (hereinafter, simply called the "axial direction") of the torsional vibration damper 1. A first carrier plate 7A is disposed on a prime mover side of the planetary gear unit 3 in the axial direction, and a second carrier plate 7B is disposed on the drive object side of the planetary gear unit 3 in the axial direction. Note that the carrier plates 7A, 7B are configured so as to rotate as one body.

The sun gear 4 and the carrier 7 are coupled via a spring damper 8 corresponding to an elastic body in the embodiments of the present disclosure. In the spring damper 8, a coil spring 12 is disposed on an inside of an aperture 11 formed in a drive member 9 and a driven member 10, and there is a configuration by which relative rotation of the drive member 9 and the driven member 10 results in the coil spring 12 elongating and contracting in a circumferential direction of the torsional vibration damper 1.

The drive member 9 in the example shown here is configured by: a first drive member 9A disposed on the prime mover side in the axial direction of the torsional vibration damper 1; and a second drive member 9B disposed on the drive object side of the first drive member 9A in the axial direction. The first drive member 9A and the second drive member 9B are both ring-shaped members, and are coupled so as to rotate as one body. Moreover, the first drive member 9A is coupled to the first coupling member 2 so as to rotate as one body with the first coupling member 2. The driven member 10 formed in a ring shape is disposed between the first drive member 9A and the second drive member 9B in the axial direction. A second coupling member 13 extending to a prime mover side in the axial direction is provided integrally to an outer peripheral section of the driven member 10, and the second carrier plate 7B is coupled to the second coupling member 13 so as to rotate as one body with the second coupling member 13. An output member 14 configured so as to enable a torque to be transmitted to the unillustrated drive object is coupled to an inner peripheral section of the driven member 10.

Now, a rotation angle of the carrier 7 with respect to the sun gear 4 will be described. In the first embodiment, a torque of the unillustrated prime mover is transmitted via the first coupling member 2 to the sun gear 4. The torque for rotating the drive object acts as a reaction force on the carrier 7. Accordingly, a load compressing the coil spring 12 of the spring damper 8 occurs, and an elastic deformation, in other words, a displacement corresponding to that load occurs in the coil spring 12. As a result, the sun gear 4 and the carrier 7 rotate relatively to each other by a certain angle. A compressive force (torsional force) acting on the coil spring 12 changes due to a cyclical pulsation, that is, a pulsation of the torque generated by the prime mover. Therefore, a relative rotation of the sun gear 4 and the carrier 7 repeatedly occurs due to the pulsation of the torque. Since the relative rotation of the sun gear 4 and the carrier 7 is a rotation due to the pulsation of the torque, the rotation angle of the carrier 7 with respect to the sun gear 4 will be a comparatively small angle corresponding to the likes of a spring constant of the coil spring 12 or a change width of the input torque. Therefore, as shown in FIG. 1, the pinion gear 6 revolves only within a certain angle range $\theta 1$ in an outer peripheral section of the sun gear 4. A remaining angle range, in other words, a non-operational region $\theta 2$ where the pinion gear 6 never rolls of the outer peripheral section of the sun gear 4 is configured as a region that although serving for maintenance of shape and maintenance of strength, is not directly concerned with transmission of torque or differential rotation. Note that when the sun gear 4 and the carrier 7 rotate relatively to each other by a certain angle due to the pulsation of the torque, the pinion gear 6 rotates within the certain angle range $\theta 1$ and the ring gear 5 is forcibly rotated.

A guide bearing 15 corresponding to a shaft supporting member in the embodiments of the present disclosure, by which a rotation center axis (hereinafter called the "axial center") of the ring gear 5 and a rotation center axis (hereinafter called the "axial center") of the carrier 7 are held on the same axis, is disposed in the above-mentioned non-operational region $\theta 2$. In the example shown here, a total of three of the guide bearings 15 are provided, one each in each of the non-operational regions $\theta 2$. The guide bearing 15 has an inner ring 16, an outer ring 17, and a plurality of rolling elements 18 disposed between the inner ring 16 and the outer ring 17, and the inner ring 16 and the outer ring 17 are allowed to rotate relatively to each other via the rolling elements 18. A pin 19 is press fitted or engaged in an inside of the inner ring 16. Both end sections of the pin 19 are respectively fixed to the carrier plates 7A, 7B. A groove section into which teeth of the ring gear 5 fit is formed over an entire periphery of an outer peripheral surface of the outer ring 17, and there is a configuration by which, due to the teeth of the ring gear 5 fitting into an inside of the groove section, the teeth of the ring gear 5 are held from both sides in the axial direction. That is, the groove section corresponds to a holding section in the embodiments of the present disclosure, and in the description below, the groove section will be called a holding section 20.

Moreover, a first gap d1 between the ring gear 5 and the holding section 20 in the axial direction is set as narrowly as possible. For example, the first gap d1 is set narrower than a second gap d2 between the ring gear 5 and each of the carrier plates 7A, 7B in the axial direction. In other words, as shown in FIG. 2, a width of the first gap d1 is set so that in a state where side surfaces of the teeth of the ring gear 5 and an inner wall surface of the holding section 20 are in contact in the axial direction due to the ring gear 5 moving in the axial direction, the ring gear 5 and each of the carrier plates 7A, 7B are not in contact. Therefore, by holding the ring gear 5 by the holding section 20, contact between the ring gear 5 and the carrier plates 7A, 7B is prevented or suppressed. As a further result, the carrier 7 and the ring gear 5 are positioned in substantially the same position in the axial direction, and the carrier 7 and the ring gear 5 are positioned aligned in the radial direction. Now, "aligned" signifies a state where at least parts of each of the carrier 7 and the ring gear 5 overlap in the radial direction.

Next, operation of the torsional vibration damper of the first embodiment will be described. When the sun gear 4 and the carrier 7 rotate relatively to each other by a certain angle due to the pulsation of the torque applied to the sun gear 4, the pinion gear 6 rotates (oscillates) within the certain angle range θ1. The ring gear 5 is forcibly rotated by the relative rotation of the sun gear 4 and the carrier 7. Since the relative rotation of the sun gear 4 and the carrier 7 is a rotation due to the pulsation of the torque, a pulsation occurs in rotation of the ring gear 5. The ring gear 5 generates an inertia torque based on a mass (moment of inertia) and angular acceleration of the ring gear 5. In the first embodiment, a rotational speed of the ring gear 5 is increased, based on a gear ratio, with respect to a rotational speed of the carrier 7, hence the angular acceleration of the ring gear 5 is increased, and, accordingly, the inertia torque is increased. This inertia torque acts as a vibration-reducing torque. As a result, the pulsation of the torque applied to the sun gear 4 is smoothed by being reduced the inertia torque of the ring gear 5, and is transmitted to the unillustrated drive object. Note that in the above-mentioned embodiment, the ring gear 5 serves as an inertia mass body.

Figure 3:
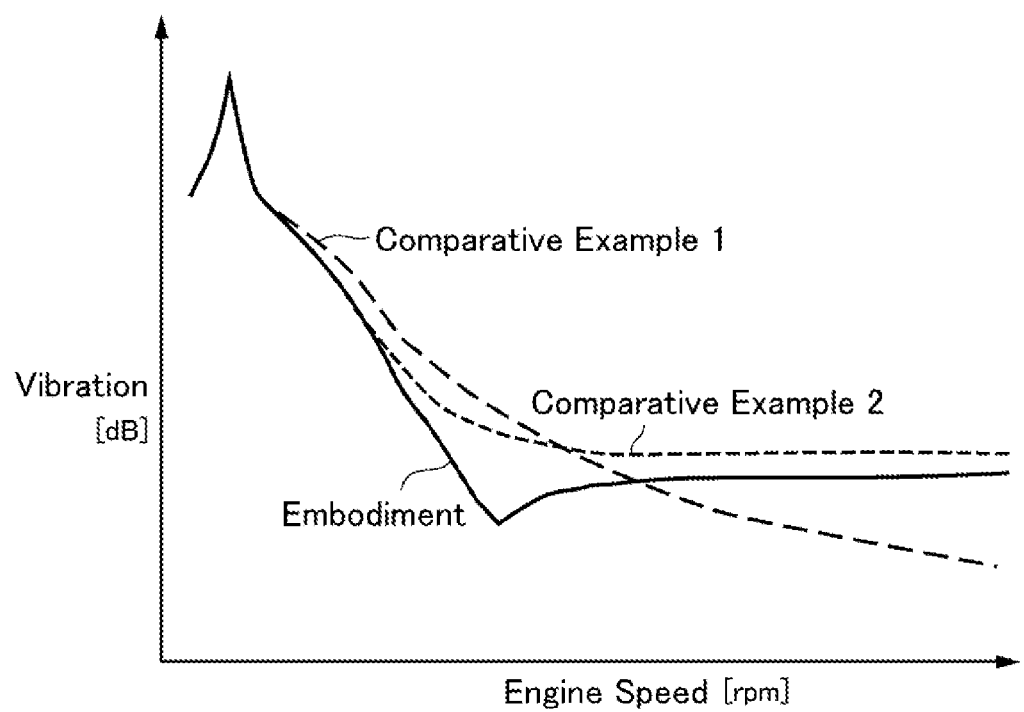
FIG. 3 is a view showing results of measuring a vibration-reducing performance of the torsional vibration damper according to the first embodiment of the present disclosure and vibration-reducing performances of comparative examples.

FIG. 3 is a graph schematically showing results of measuring a vibration-reducing performance of the torsional vibration damper according to the first embodiment of the present disclosure and vibration-reducing performances of comparative examples. Comparative example 1 depicted in FIG. 3 is an example configured so that only the spring damper 8 is used to reduce the fluctuation of torque transmitted from the prime mover to the drive object. Comparative example 2 is an example configured so that movement of the ring gear 5 in the axial direction is suppressed by employing the likes of a snap ring or thrust washer, instead of the holding section 20 in the guide bearing 15. The horizontal axis in FIG. 3 is a speed of the prime mover, that is, an engine speed, and the vertical axis in FIG. 3 is a magnitude of the torque pulse. It is found from the measurement results shown in FIG. 3 that by providing the guide bearing 15 and the holding section 20, the torque pulse in a state where the engine speed is low is effectively suppressed.

That is, in the first embodiment, the axial center of the ring gear 5 and the axial center of the carrier 7 can be held in a substantially coinciding state by the guide bearing 15, hence the likes of a change in backlash or a change in contact ratio between the ring gear 5 and each of the pinion gears 6 can be prevented or suppressed. As a result, it can be prevented or suppressed that a tooth striking noise is generated due to backlash increasing between the ring gear 5 and each of the pinion gears 6, that vibration caused by this generation of tooth striking noise occurs, or that gear loss deteriorates. In addition, since movement of the ring gear 5 in the axial direction can be suppressed by the holding section 20, it can be prevented or suppressed that a sliding resistance occurs between the ring gear 5 and the carrier plates 7A, 7B due to the ring gear 5 and the carrier plates 7A, 7B making contact. As a result of the above, the ring gear 5 can be smoothly rotated according to the pulsation of the torque, and the vibration-reducing performance can be improved, or, an anticipated vibration-reducing performance may be obtained. Moreover, due to the guide bearing 15 being disposed in the non-operational region θ2 where the pinion gear 6 never rolls, vacant space can be effectively utilized, and an increase in size of the damper due to the guide bearing 15 being provided, can be avoided or suppressed.

Second Embodiment

Figure 4:
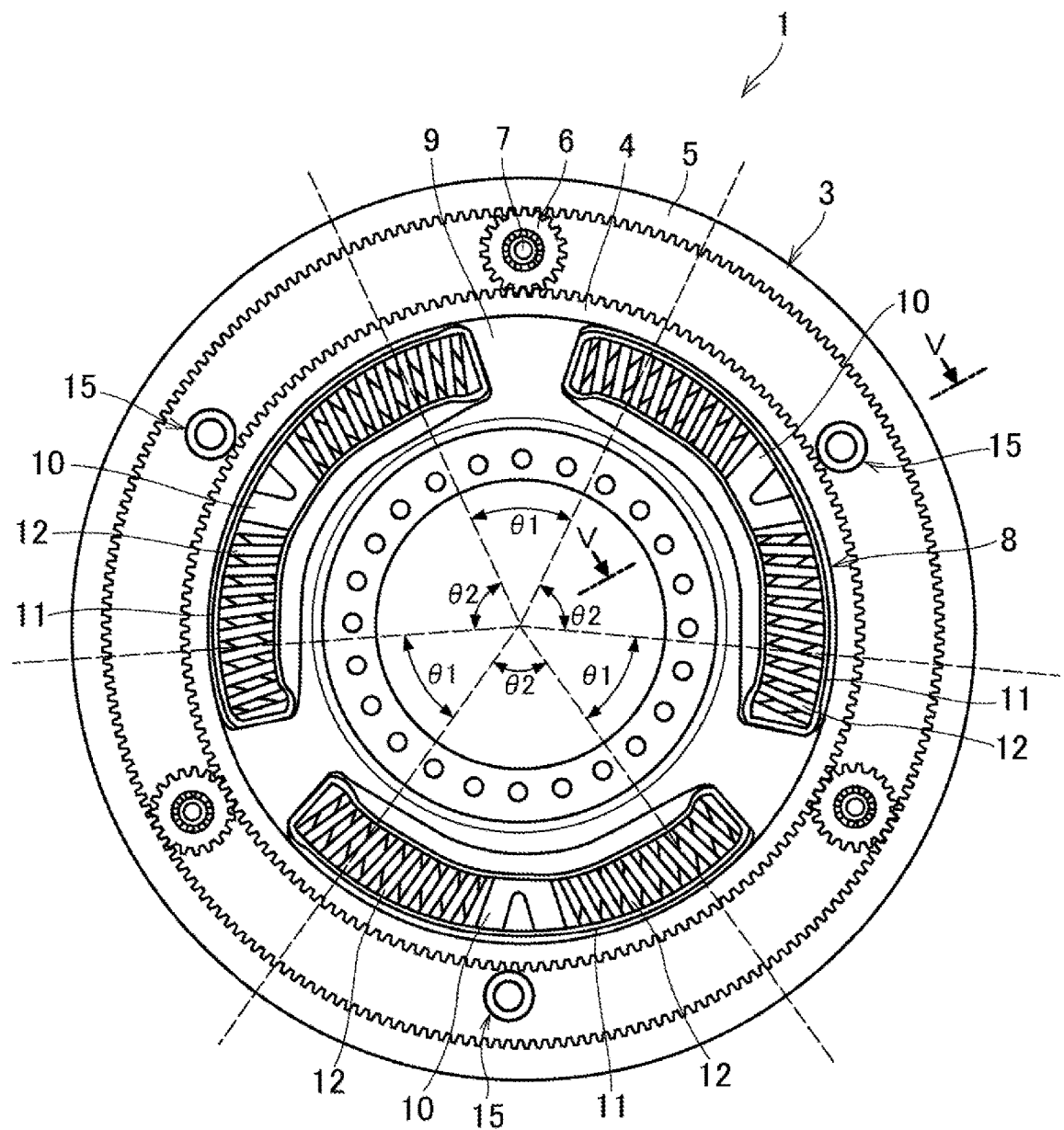
FIG. 4 is a front view showing one example of the torsional vibration damper according to the second embodiment of the present disclosure.
Figure 5:
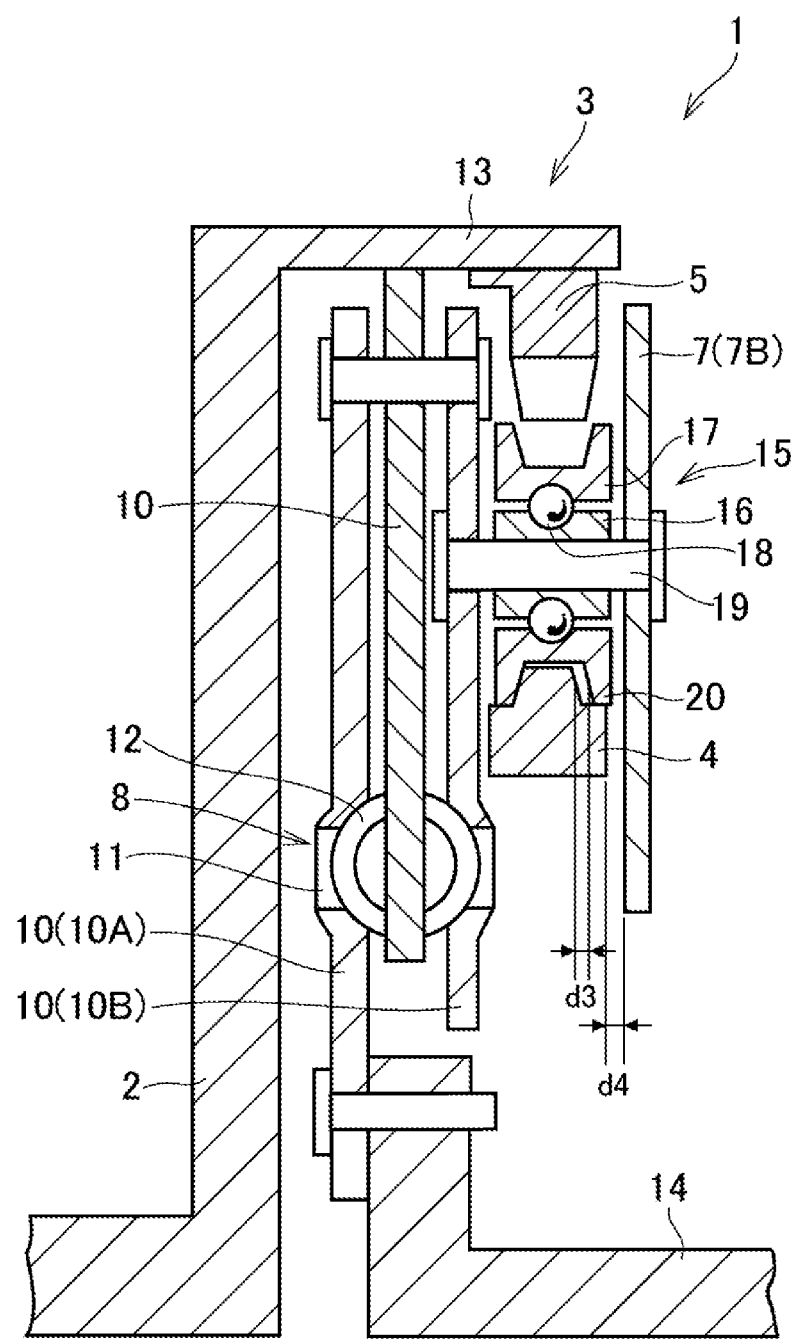
FIG. 5 is a cross-sectional view taken along the V-V line of FIG. 4 looking in the direction of the arrows.

FIG. 4 is a front view showing a torsional vibration damper according to a second embodiment of the present disclosure, and FIG. 5 is a cross-sectional view taken along the V-V line of FIG. 4 looking in the direction of the arrows. The example shown here is an example where the sun gear 4 is caused to serve as the inertia mass body, the ring gear 5 is coupled to the first coupling member 2, and the carrier 7 is provided integrally to the driven member 10 of the spring damper 8. In the second embodiment, the driven member 10 is configured by: a first driven member 10A disposed on a prime mover side in the axial direction; and a second driven member 10B disposed on a drive object side of the first driven member 10A in the axial direction. The first driven member 10A and the second driven member 10B are both formed in a ring shape, and are coupled so as to rotate as one body. The first driven member 10A is coupled to the output member 14 so as to rotate as one body with the output member 14. The carrier 7 and the guide bearing 15 are provided integrally to the second driven member 10B. In other words, the second driven member 10B serves also as the carrier plate 7A. The drive member 9 formed in a ring shape is disposed between the first driven member 10A and the second driven member 10B in the axial direction. An outer peripheral section of the first coupling member 2 extends to a drive object side in the axial direction, and an outer peripheral section of the drive member 9 is coupled so as to enable a torque to be transmitted, to an inner surface of the first coupling member 2.

In the second embodiment, the guide bearing 15 is configured so that a rotation center axis (hereinafter called the "axial center") of the sun gear 4 and the axial center of the carrier 7 are held on the same axis, and a third gap d3 between the sun gear 4 and the holding section 20 in the axial direction is set narrower than a fourth gap d4 between the sun gear 4 and the carrier plate 7B or the second driven-side member 10B in the axial direction. In other words, similarly to in the first embodiment, a width of the third gap d3 is set so that in a state where side surfaces of teeth of the sun gear 4 and the inner wall surface of the holding section 20 are in contact in the axial direction due to the sun gear 4 moving in the axial direction, the sun gear 4 and the carrier plate 7B or the second driven member 10B are not in contact. This results in a configuration whereby contact between the sun gear 4 and the carrier plate 7B in the axial direction and contact between the sun gear 4 and the second driven member 10B in the axial direction are prevented or suppressed. Other configurations are similar to the configurations shown in FIG. 1, hence portions similar to the configurations shown in FIG. 1 will be assigned with similar symbols to in FIG. 1, and descriptions thereof will be omitted.

Operation of the torsional vibration damper of the second embodiment will be described. Even in the case configured as shown in FIGS. 4 and 5, when the compressive force (torsional force) acting on the coil spring 12 changes due to the pulsation of the torque transmitted to the ring gear 5, the ring gear 5 and the carrier 7 rotate relatively to each other by a certain angle. Accordingly, the pinion gear 6 rotates within the certain angle range θ1, and the sun gear 4 is forcibly rotated. As a result, the sun gear 4 generates an inertia torque based on the pulsation of the torque. In the second embodiment, a rotational speed of the sun gear 4 is increased, based on a gear ratio, with respect to a rotational speed of the carrier 7, hence the angular acceleration of the sun gear 4 is increased, and, accordingly, the inertia torque is increased. The pulsation of the torque is reduced by that inertia torque of the sun gear 4. Moreover, the axial center of the sun gear 4 and the axial center of the carrier 7 are held in a substantially coinciding state by the guide bearing 15, hence the likes of a change in backlash or a change in contact ratio between the sun gear 4 and each of the pinion gears 6 can be prevented or suppressed. Furthermore, since movement of the sun gear 4 in the axial direction is suppressed by the holding section 20, contact between the sun gear 4 and the carrier plate 7B and contact between the sun gear 4 and the second driven member 10B can be suppressed, and it can be prevented or suppressed that a sliding resistance occurs between the sun gear 4 and carrier plate 7B or the sun gear 4 and second driven member 10B. As a result of the above, similarly to in the first embodiment, the sun gear 4 can be smoothly rotated according to the pulsation of the torque, and the vibration-reducing performance can be improved, or, an anticipated vibration-reducing performance may be obtained.

Third Embodiment

Figure 6:
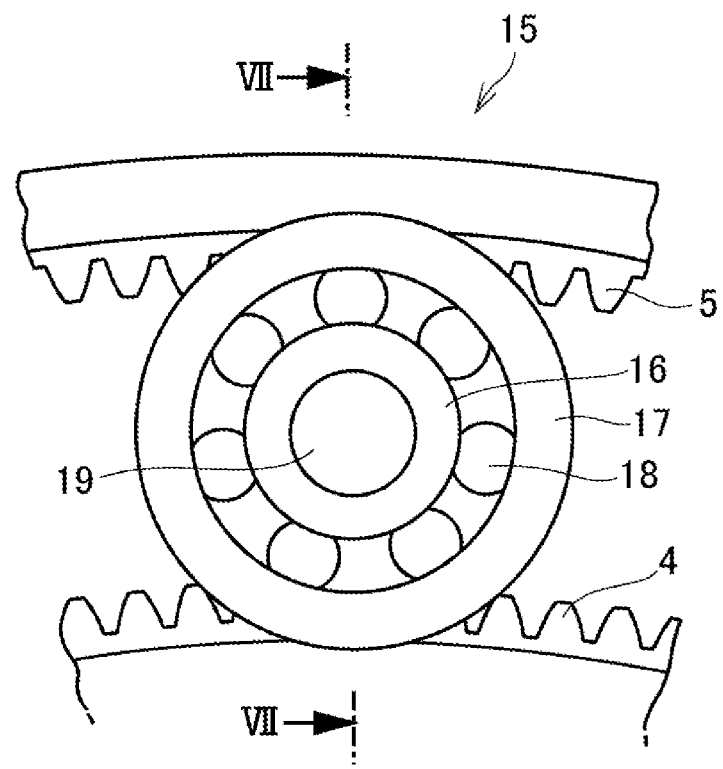
FIG. 6 is a front view showing one example of a guide bearing in the third embodiment of the present disclosure.
Figure 7:
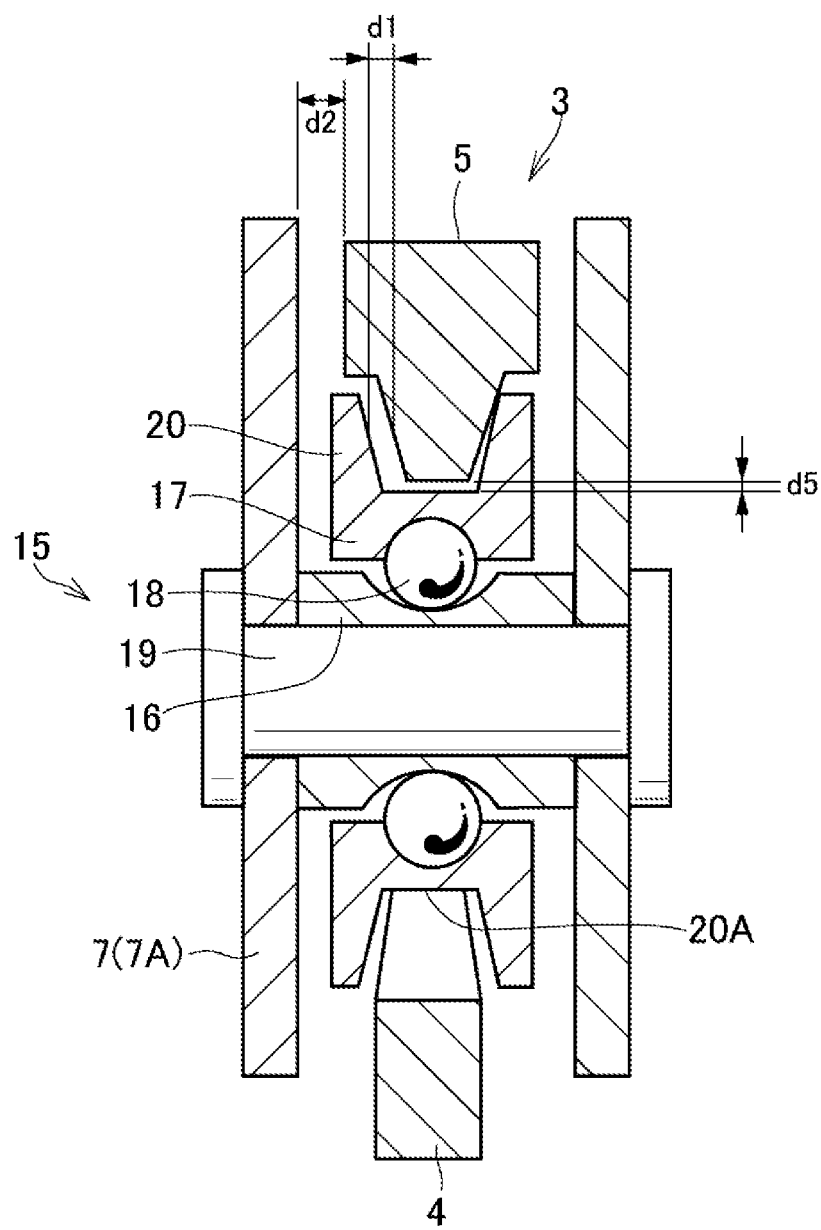
FIG. 7 is a cross-sectional view taken along the VII-VII line of FIG. 6 looking in the direction of the arrows.
Figure 8:
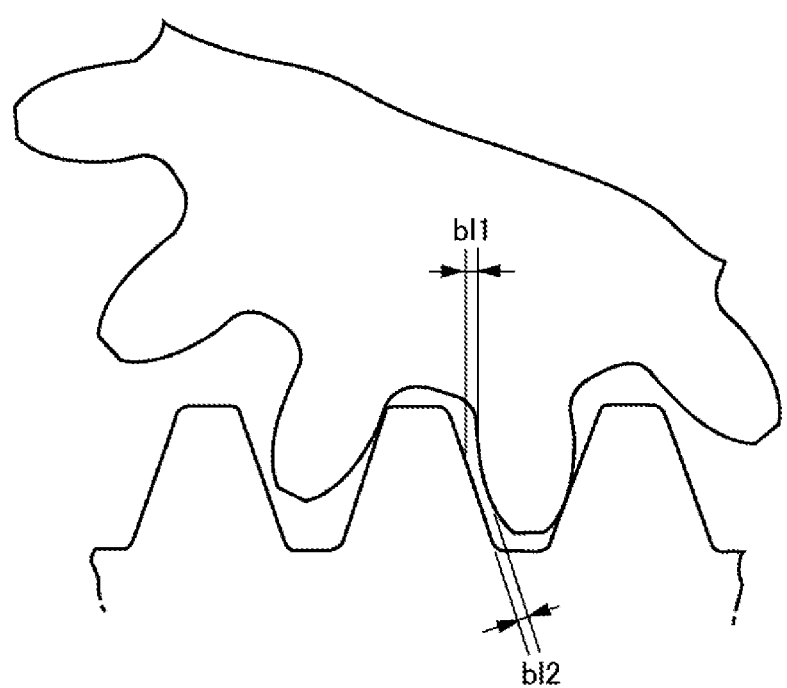
FIG. 8 is a schematic view for explaining a backlash between a sun gear and a pinion gear in a circumferential direction of a planetary gear unit.

FIG. 6 is a front view showing one example of a guide bearing 15 in a third embodiment of the present disclosure, and FIG. 7 is a cross-sectional view taken along the VII-VII line of FIG. 6 looking in the direction of the arrows. The example shown here is an example configured so that the teeth of the sun gear 4 and the teeth of the ring gear 5 are each held from both sides in the axial direction by the guide bearing 15. In the example shown in FIGS. 6 and 7, a tooth tip of the sun gear 4 is in contact with a bottom section 20A of the holding section 20 on an inner side in the radial direction of the planetary gear unit 3. A fifth gap d5 between the bottom section 20A of the holding section 20 on an outer side in the radial direction of the planetary gear unit 3 and a tooth tip of the ring gear 5 is set as narrowly as possible. The fifth gap d5 is, for example, set narrower than a backlash bl1 between the ring gear 5 and the pinion gear 6 in a circumferential direction of a pitch circle of the pinion gear 6 of the planetary gear unit 3 shown in FIG. 8 and a backlash bl2 in a normal direction to engaging tooth surfaces, in other words, a contact point between the pinion gear 6 and the sun gear 4 or ring gear 5 of the planetary gear unit 3 shown in FIG. 8. In short, the fifth gap d5 is set narrower than the backlashes bl1, bl2 between fellow engaging gears. As a result, the axial center of the ring gear 5 and the axial center of the carrier 7 end up being held in a substantially coinciding state. Note that similarly to in the first embodiment, the width of the first gap d1 is set so that in a state where side surfaces of the teeth of the ring gear 5 and an inner wall surface of the holding section 20 are in contact in the axial direction due to the ring gear 5 moving in the axial direction, the ring gear 5 and each of the carrier plates 7A, 7B are not in contact, and a configuration is adopted whereby contact between the ring gear 5 and the carrier plates 7A, 7B in the axial direction is prevented or suppressed. Other configurations are similar to the configurations shown in FIGS. 2 and 5, hence portions similar to the configurations shown in FIGS. 2 and 5 will be assigned with similar symbols to in FIGS. 2 and 5, and descriptions thereof will be omitted.

Operation of the torsional vibration damper of the third embodiment will be described. In the case configured as shown in FIGS. 6 and 7, the fifth gap d5 is narrower than each of the backlashes bl1, bl2 of the planetary gear unit 3, hence in the case where, for example, the ring gear 5 has been displaced in the radial direction with respect to the carrier 7, the fifth gap d5 decreases whereby the holding section 20 and the ring gear 5 make contact. This leads to displacement of the ring gear 5 in the radial direction being suppressed. As a result, the axial center of the sun gear 4, the axial center of the ring gear 5, and the axial center of the carrier 7 can be held on substantially the same axis. Since this amounts to centering for the entire planetary gear unit 3 being performed by the guide bearing 15, misalignments of engagement of each of fellow gears can be reduced. As a result of the above, it can be prevented or suppressed that loss increases due to contact ratios of each of fellow gears changing, that a tooth striking noise is generated due to the backlashes bl1, bl2 increasing, or that vibration accompanying this generation of tooth striking noise occurs. Therefore, the vibration-reducing performance can be improved, or, an anticipated vibration-reducing performance may be obtained.

Fourth Embodiment

Figure 9:
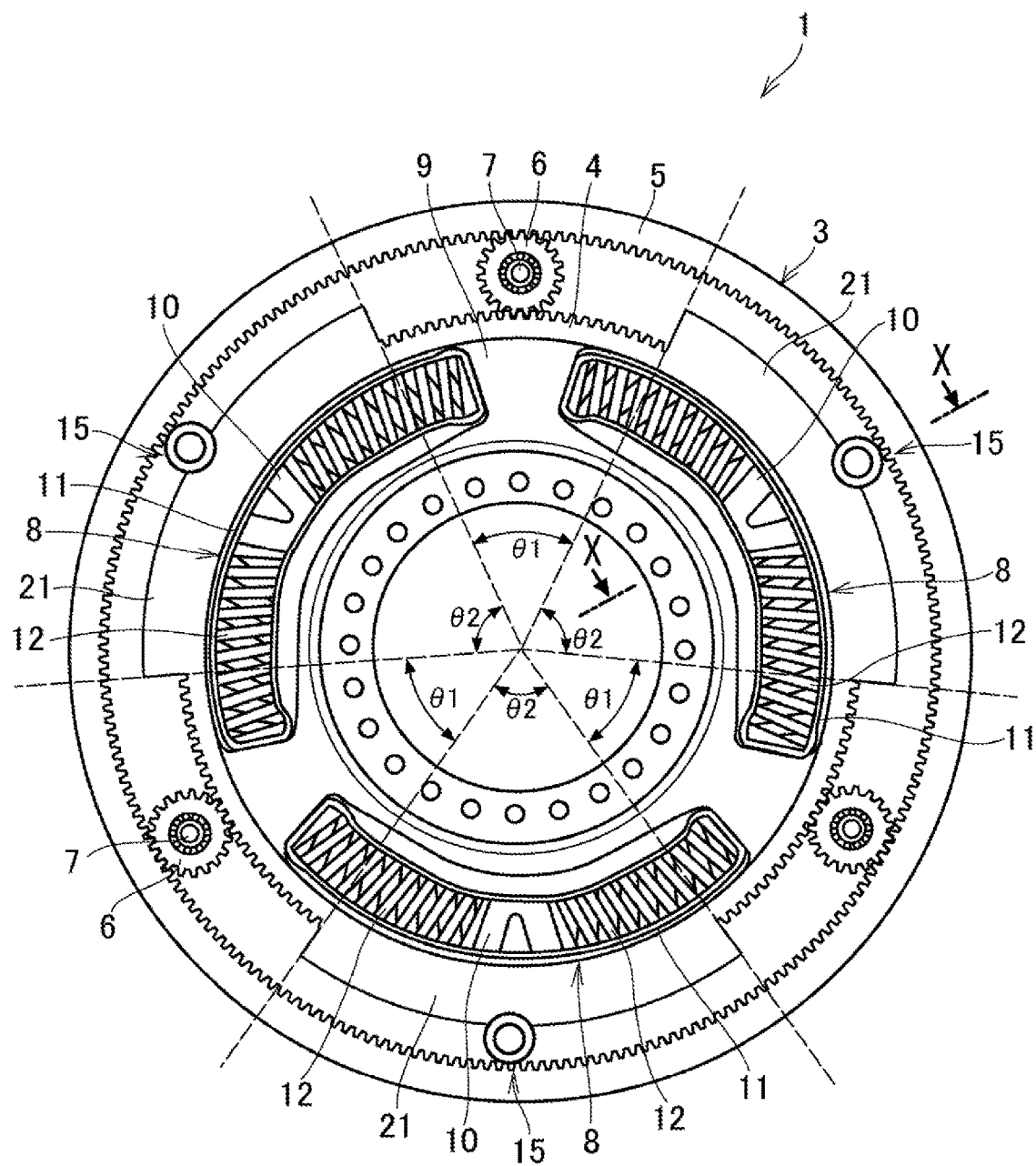
FIG. 9 is a front view showing one example of the torsional vibration damper according to the fourth embodiment of the present disclosure.
Figure 10:
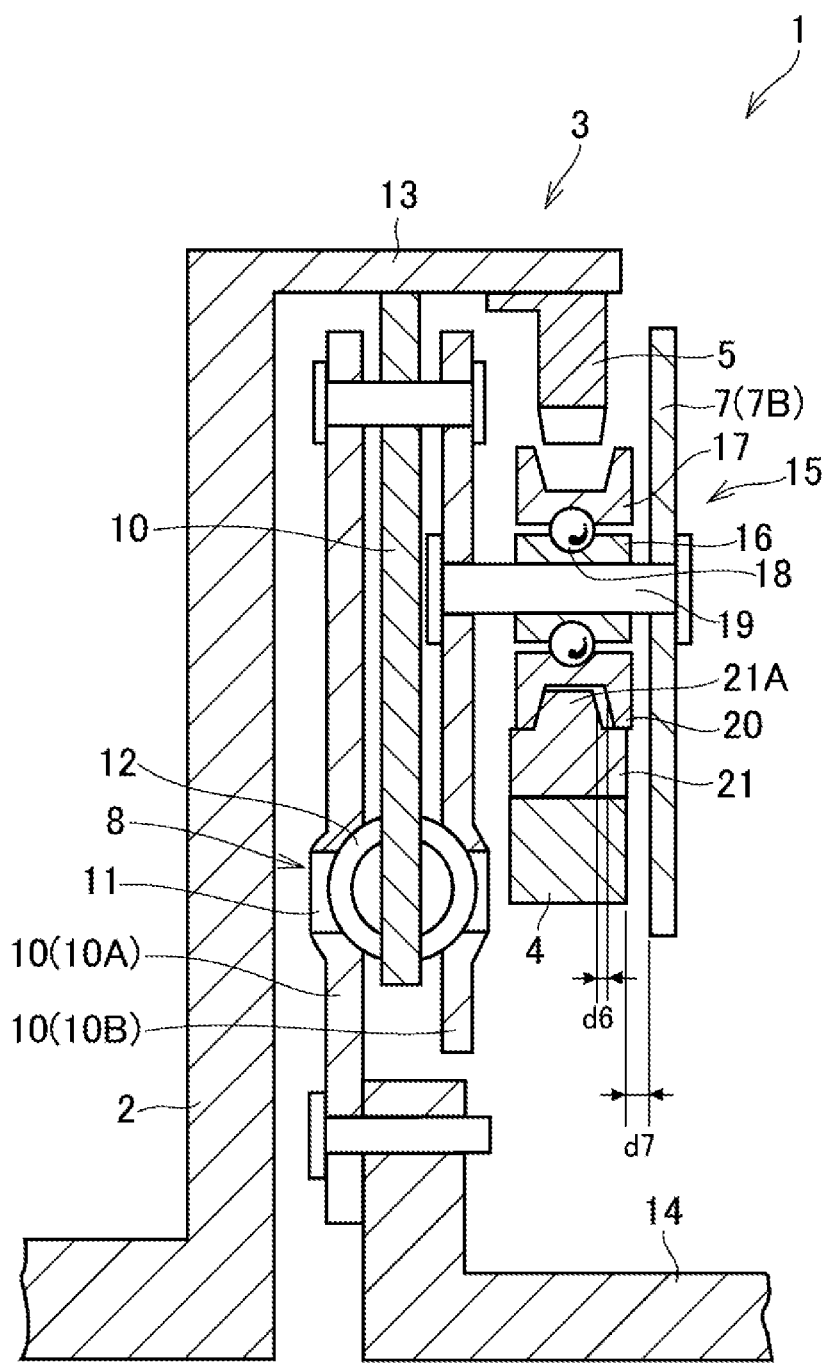
FIG. 10 is a cross-sectional view taken along the X-X line of FIG. 9 looking in the direction of the arrows.

FIG. 9 is a front view showing a torsional vibration damper according to a fourth embodiment of the present disclosure, and FIG. 10 is a cross-sectional view taken along the X-X line of FIG. 9 looking in the direction of the arrows. The example shown here is an example where a mass increasing section 21 projecting inside the non-operational region θ2 is provided in at least part of a place corresponding to the non-operational region θ2 of the outer peripheral section of the sun gear 4. The mass increasing section 21 may be, for example, a portion where the teeth of the sun gear 4 are not formed in a gear material forming the sun gear 4. Therefore, a thickness of the mass increasing section 21 in the axial direction is configured substantially the same as a thickness of the sun gear 4. A projecting section 21A that fits in the holding section 20 is formed in an outer peripheral section of the mass increasing section 21, and there is a configuration whereby both sides of the projecting section 21A are held in the axial direction by the holding section 20. A sixth gap d6 between the projecting section 21A and the holding section 20 in the axial direction is set as narrowly as possible. The sixth gap d6 is, for example, set narrower than a seventh gap d7 between the sun gear 4 and the carrier plate 7B in the axial direction. In other words, similarly to in the second embodiment, a width of the sixth gap d6 is set so as to suppress contact between the sun gear 4 and carrier plate 7B and between the sun gear 4 and second driven-side member 10B in the axial direction due to the sun gear 4 moving in the axial direction. Note that it is possible for a weighted piece having a curved shape following an external shape of the sun gear 4 to be prepared, and for that weighted piece to be adopted as the mass increasing section 21 by being fixed to the outer peripheral section of the sun gear 4 by the likes of a rivet or a bolt. In short, the mass increasing section 21 should be disposed within the non-operational region θ2 and configured so as to increase a mass of the sun gear 4. Other configurations are similar to the configurations shown in FIG. 5, hence portions similar to the configurations shown in FIG. 5 will be assigned with similar symbols to in FIG. 5, and descriptions thereof will be omitted.

Operation of the torsional vibration damper of the fourth embodiment will be described. In the case configured as shown in FIGS. 9 and 10, the mass increasing section 21 along with the sun gear 4 serve as the inertia mass body for vibration attenuation, and there is generated an inertia torque which is based on a summed mass (moment of inertia) of the mass of the mass increasing section 21 and the mass of the sun gear 4, and on an angular acceleration. Since the inertia torque thus increases by a portion of the mass increasing section 21, the vibration-reducing performance can be improved. Moreover, the mass increasing section 21 is supported by the guide bearing 15, hence deformation of the sun gear 4 due to a radial load that occurs with rotation of the sun gear 4 and the mass increasing section 21, can be prevented or suppressed. As a result, a change in contact ratio or deterioration of gear loss accompanying deformation of the sun gear 4 can be prevented or suppressed. That is, the sun gear 4 having the mass increasing section 21 can be smoothly rotated thereby further improving the vibration-reducing performance. Furthermore, because the mass increasing section 21 is disposed within the non-operational region θ2, it is possible to suppress an increase in shaft length of the planetary rotary unit 3 due to the mass increasing section 21 being provided.

Fifth Embodiment

Figure 11:
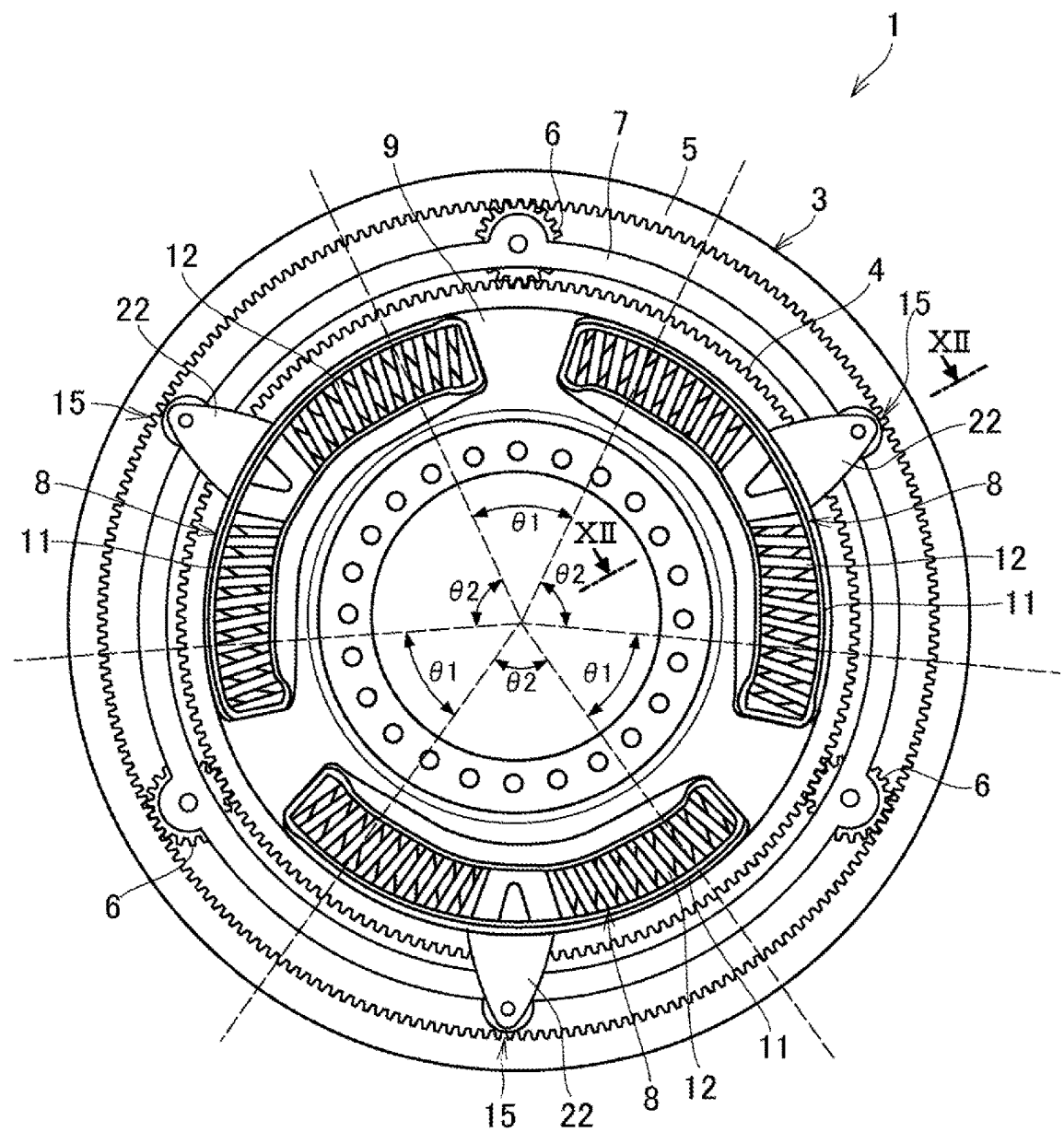
FIG. 11 is a front view showing one example of the torsional vibration damper according to the fifth embodiment of the present disclosure.
Figure 12:
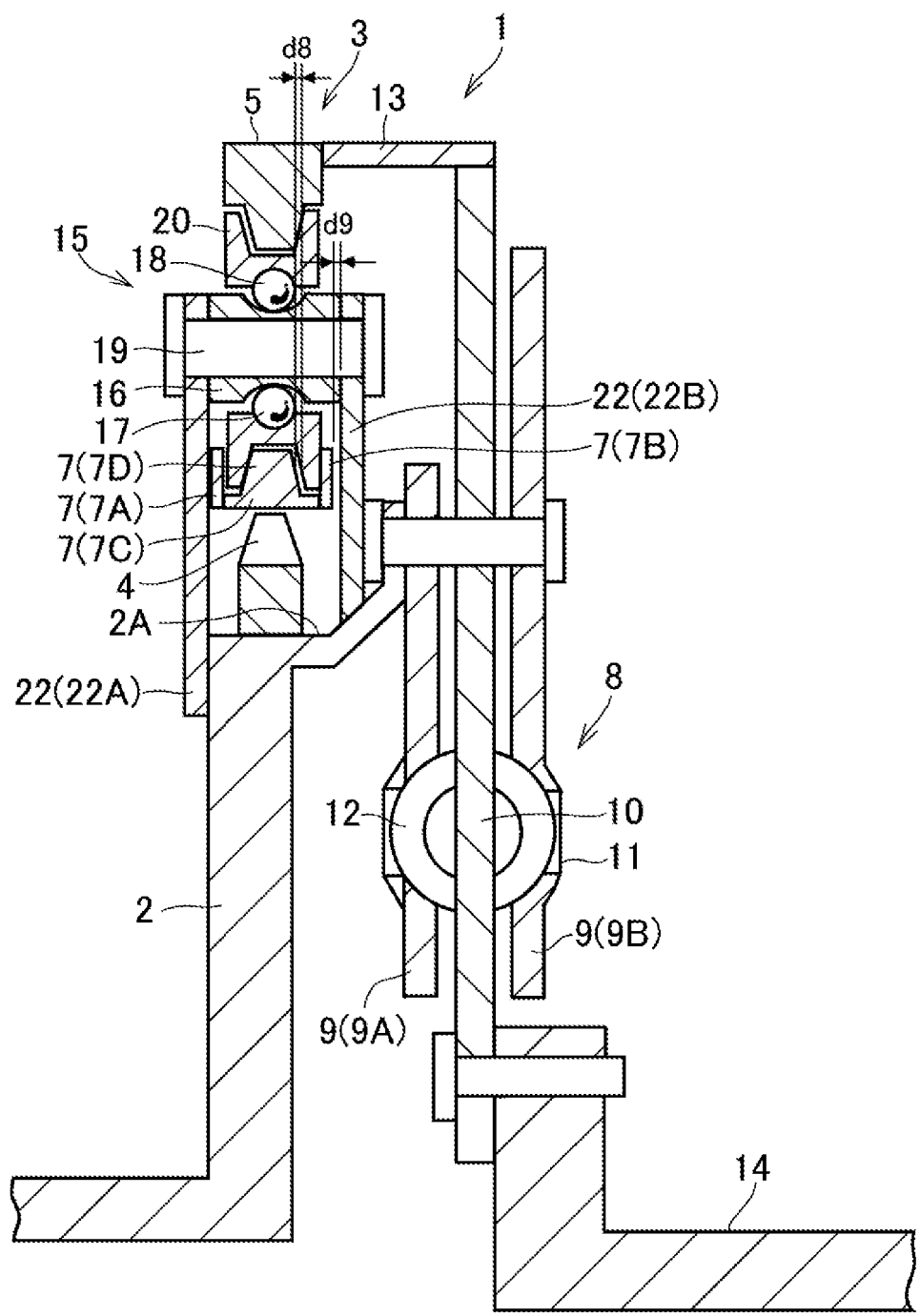
FIG. 12 is a cross-sectional view taken along the XII-XII line of FIG. 11 looking in the direction of the arrows.

FIG. 11 is a front view showing a torsional vibration damper according to a fifth embodiment of the present disclosure, and FIG. 12 is a cross-sectional view taken along the XII-XII line of FIG. 11 looking in the direction of the arrows. The example shown here is an example where the carrier 7 is caused to serve as the inertia mass body. The carrier plates 7A, 7B configuring the carrier 7 are both formed in a ring shape, and each of inner diameters of each of the carrier plates 7A, 7B is set larger than an outer diameter of the sun gear 4. Moreover, each of outer diameters of each of the carrier plates 7A, 7B is set smaller than an inner diameter of the ring gear 5. Furthermore, a coupling section 7C extending in the axial direction is integrally formed in an inner peripheral section of either one of the carrier plate 7A and the carrier plate 7B, and the carrier plate 7A and the carrier plate 7B are coupled via the coupling section 7C. A projecting section 7D is formed in an outer peripheral section of the coupling section 7C, and there is a configuration whereby both sides of the projecting section 7D are supported by the holding section 20 in the axial direction.

A flange section 22 is provided in at least part of a place corresponding to the non-operational region θ2 of the sun gear 4, in a state of projecting inside the non-operational region θ2, so as to rotate integrally with the sun gear 4. The flange section 22 is configured by: a first flange section 22A disposed on a prime mover side of the planetary gear unit 3 in the axial direction; and a second flange section 22B disposed on a drive object side of the planetary gear unit 3 in the axial direction. The first flange section 22A is integrally provided to a side surface of the sun gear 4 on the prime mover side in the axial direction, and the second flange section 22B is integrally provided more on the drive object side than the sun gear 4 of the outer peripheral surface 2A of the first coupling member 2. The carrier plates 7A, 7B are disposed between the first flange section 22A and the second flange section 22B in the axial direction. The guide bearing 15 is disposed between the carrier plates 7A, 7B in the axial direction and concentrically on an outer peripheral side of each of the carrier plates 7A, 7B in the radial direction.

The guide bearing 15 is installed between the first flange section 22A and the second flange section 22B, and both sides of the above-mentioned projecting section 7D are held in the axial direction by the holding section 20. An eighth gap d8 between the projecting section 7D and the holding section 20 in the axial direction is set as narrowly as possible. The eighth gap d8 is, for example, set narrower than a ninth gap d9 between each of the carrier plates 7A, 7B and each of the flange sections 22A, 22B in the axial direction. In other words, a width of the eighth gap d8 is set so as to suppress contact between the carrier 7 and each of the flange sections 22A, 22B in the axial direction due to the carrier 7 moving in the axial direction. Other configurations are similar to the configurations shown in FIG. 1, hence portions similar to the configurations shown in FIG. 1 will be assigned with similar symbols to in FIG. 1, and descriptions thereof will be omitted. Note that the above-mentioned mass increasing section 21 may be provided in a position between the carrier plates 7A, 7B in the axial direction and not in contact with the guide bearing 15 in the circumferential direction of the planetary gear unit 3.

Figure 13:
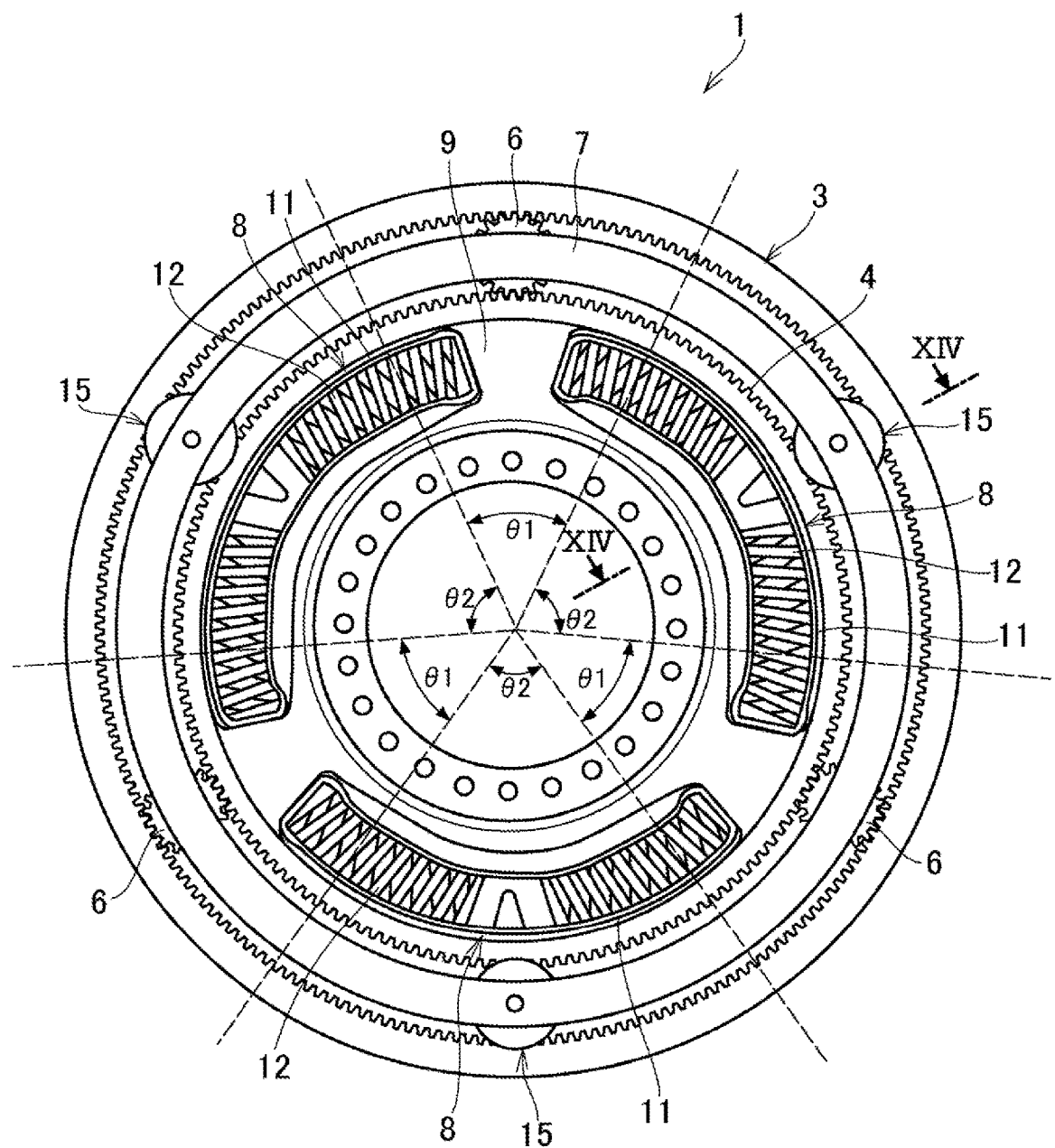
FIG. 13 is a front view showing one example of the torsional vibration damper according to the sixth embodiment of the present disclosure.

Operation of the torsional vibration damper of the fifth embodiment will be described. Even in the case configured as shown in FIGS. 12 and 13, the compressive force (torsional force) acting on the coil spring 12 changes due to the vibration of the torque transmitted to the sun gear 4, and the sun gear 4 and the ring gear 5 rotate relatively to each other by a certain angle. Accordingly, the pinion gear 6 rotates within the certain angle range θ1, and the carrier 7 is forcibly rotated. As a result, the carrier 7 generates an inertia torque based on the vibration of the torque, and the vibration of the torque is reduced by the inertia torque of the carrier 7. In addition, the axial center of the sun gear 4 and the axial center of the ring gear 5 are held in a substantially coinciding state by the guide bearing 15. Moreover, the projecting section 7D of the carrier 7 is held by the holding section 20, hence movement of the carrier 7 in the axial direction can be suppressed. Therefore, a change in backlash or a change in contact ratio, and so on, between the sun gear 4 and ring gear 5 and each of the pinion gears 6, can be prevented or suppressed. As a result of the above, the carrier 7 can be smoothly rotated whereby similarly to in each of the embodiments, the vibration-reducing performance can be improved, or, an anticipated vibration-reducing performance may be obtained.

Sixth Embodiment

Figure 14:
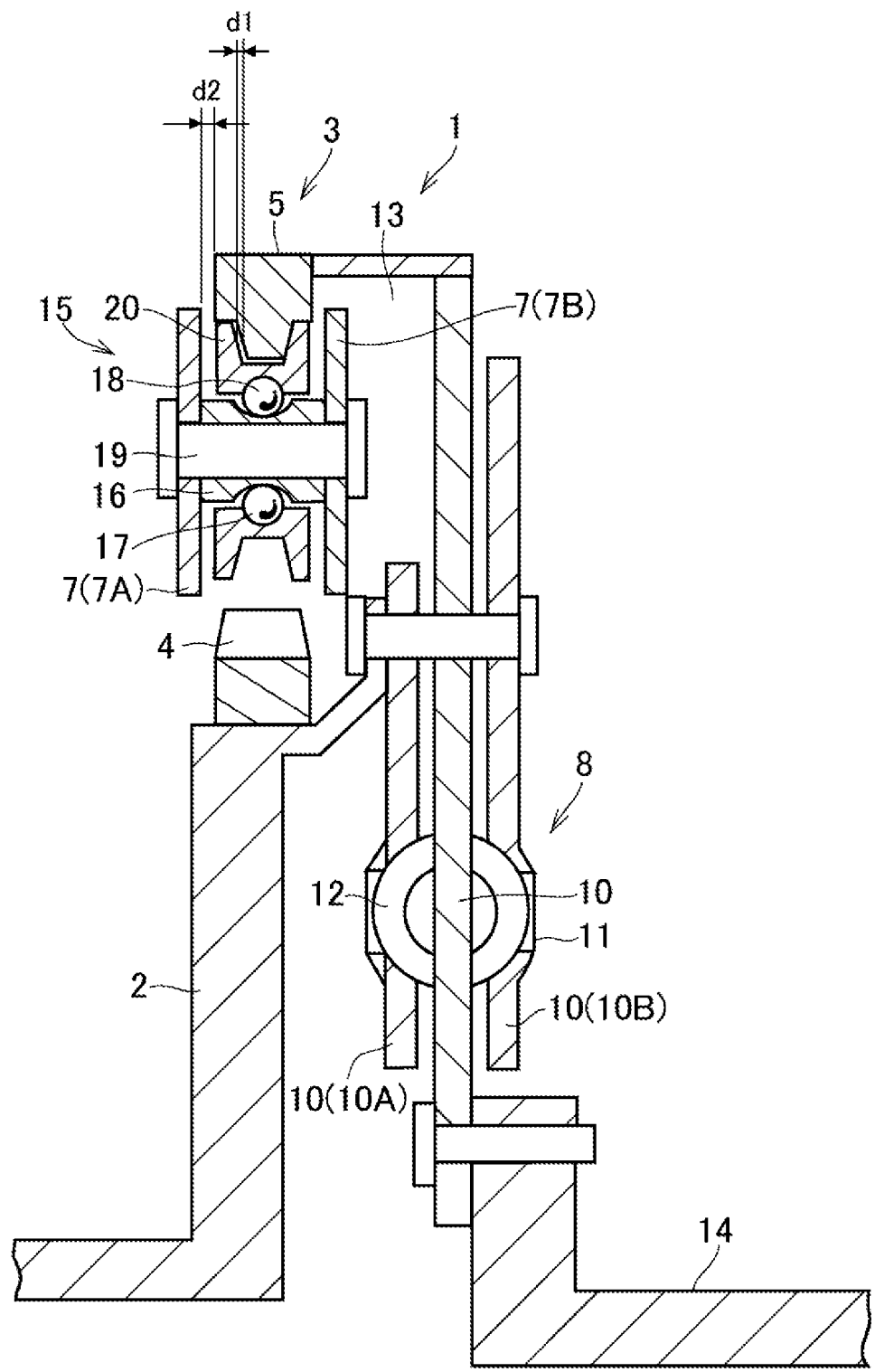
FIG. 14 is a cross-sectional view taken along the XIV-XIV line of FIG. 13 looking in the direction of the arrows.

FIG. 13 is a front view showing a torsional vibration damper according to a sixth embodiment of the present disclosure, and FIG. 14 is a cross-sectional view taken along the XIV-XIV line of FIG. 13 looking in the direction of the arrows. The example shown here is an example where the carrier 7 is caused to serve as the inertia mass body, and the guide bearing 15 is provided to the carrier 7. As shown in FIGS. 13 and 14, the carrier plates 7A, 7B are both formed in a ring shape. Each of the inner diameters of each of the carrier plates 7A, 7B is set larger than the outer diameter of the sun gear 4, and each of the outer diameters of each of the carrier plates 7A, 7B is set smaller than the inner diameter of the ring gear 5. The guide bearing 15 is disposed in a place corresponding to the non-operational region θ2 of the outer peripheral section of the sun gear 4, and the pin 19 which is fixed to the carrier plates 7A, 7B is press fitted or engaged in the inner ring 16 of the guide bearing 15. Both sides of the teeth of the ring gear 5 are held in the axial direction by the holding section 20. The first gap d1 between the ring gear 5 and the holding section 20 in the axial direction is set narrower than the second gap d2 between the ring gear 5 and each of the carrier plates 7A, 7B. This results in a configuration whereby when the ring gear 5 is held by the holding section 20, contact between the ring gear 5 and the carrier plate 7A is prevented or suppressed. Other configurations are similar to the configurations shown in FIGS. 11 and 12, hence portions similar to the configurations shown in FIGS. 11 and 12 will be assigned with similar symbols to in FIGS. 11 and 12, and descriptions thereof will be omitted. Note that the above-mentioned mass increasing section 21 may be provided in a position between the carrier plates 7A, 7B in the axial direction and not in contact with the guide bearing 15.

Operation of the torsional vibration damper of the sixth embodiment will be described. In the configuration shown in FIGS. 13 and 14, the carrier 7 and the guide member 15 rotate integrally, hence a gap between the pinion gear 6 and the guide bearing 15 in the circumferential direction ends up being maintained, and the mass increasing section 21 can be provided in that gap. In other words, the mass increasing section 21 can be disposed in as broad a range as possible. Moreover, because the inertia torque of the carrier 7 can be increased by portions of the mass increasing section 21 and the guide bearing 15, the inertia torque that acts as a resistance to the vibration of the torque can be increased. Furthermore, the axial center of the ring gear 5 and the axial center of the carrier 7 are held on the same axis by the guide bearing 15, and movement in the axial direction of the pinion gear is suppressed, hence rotation of the carrier 7 gets smoothed. As a result of the above, similarly to in each of the embodiments, the vibration-reducing performance can be improved, or, an anticipated vibration-reducing performance may be obtained.

Figure 15:
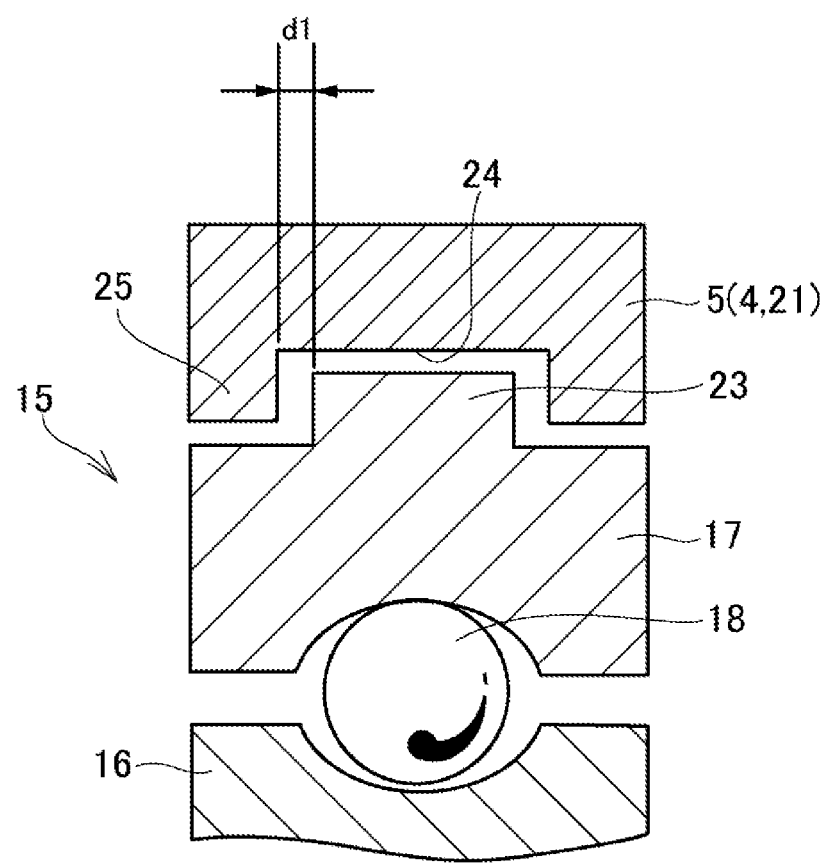
FIG. 15 is a view schematically showing another example of configuration of a holding section of the guide bearing in the embodiments of the present disclosure.

In each of the above-mentioned embodiments, a configuration was adopted whereby both sides in the axial direction of the sun gear 4 and ring gear 5 and the mass increasing section 21 were held by the holding section 20. However, in short, there need only be a configuration whereby the holding section 20 fits with the sun gear 4, the ring gear 5, and the mass increasing section 21 to suppress movement of these in the axial direction. FIG. 15 is a view schematically showing another example of configuration of the holding section 20 of the guide bearing 15 in the embodiments of the present disclosure. Described taking the first, fifth, and sixth embodiments as examples, a ring-shaped projecting section 23 is formed over an entire periphery of an outer peripheral surface of the outer ring 17, and a recessed section 24 fitting with the projecting section 23 is formed in a central section of the ring gear 5 in the axial direction. A gap d1 between the recessed section 24 and the projecting section 23 in a state where the projecting section 23 of the guide bearing 15 is fitted in the recessed section 24 of the ring gear 5 is set narrower than a gap d2 between the ring gear 5 and each of the carrier plates 7A, 7B. This results in movement of the ring gear 5 in the axial direction being suppressed.

Moreover, in the second embodiment, the recessed section 24 fitting with the projecting section 23 is formed in a central section of the sun gear 4 in the axial direction. A gap d3 between the recessed section 24 and the projecting section 23 in a state where the projecting section 23 of the guide bearing 15 is fitted in the recessed section 24 of the sun gear 4 is set narrower than a gap d4 between the sun gear 4 and each of the carrier plates 7A, 7B. This results in movement of the sun gear 4 in the axial direction being suppressed. In the third embodiment, the above-mentioned recessed section 24 is formed in each of the sun gear 4 and the ring gear 5, and as mentioned above, the gap d1 is set narrower than the gap d2, and the gap d3 is set narrower than the gap d4. In the fourth embodiment, the recessed section 24 is formed in a central section of the mass increasing section 21 in the axial direction, and a gap d5 is set narrower than a gap d6. Thus, in the example shown in FIG. 15, the recessed section 24 and the projecting section 23 are configured to serve as the holding section 20, and even such a configuration makes it possible for movement of the sun gear 4, the ring gear 5, and the mass increasing section 21 in the axial direction to be suppressed.

Figure 16:
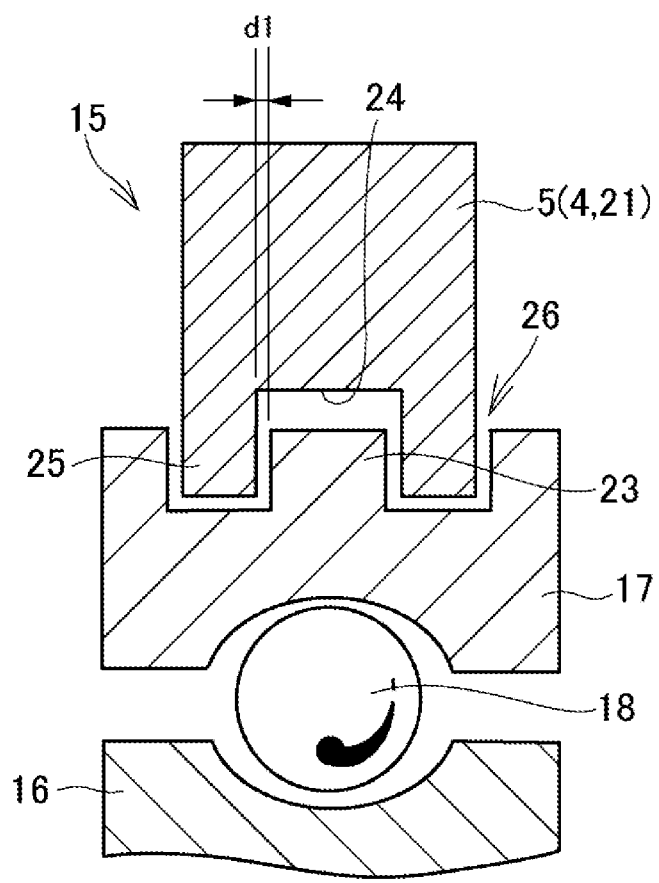
FIG. 16 is a view schematically showing yet another example of configuration of the holding section of the guide bearing in the embodiments of the present disclosure.

FIG. 16 is a view schematically showing yet another example of configuration of the holding section 20 of the guide bearing 15 in the embodiments of the present disclosure. The example shown here is an example configured so that both sides and the central section in the axial direction of the sun gear 4, the ring gear 5, and the mass increasing section 21 are held by the guide bearing 15. That is, in the first and fifth and the sixth embodiments, a recessed-cum-projecting section 26 fitting with the recessed section 24 formed in the central section of the ring gear 5 and with side wall sections 25 on both sides of the recessed section 24 in the axial direction, is formed over the entire periphery of the outer peripheral surface of the outer ring 17. Moreover, a gap d1 between the recessed section 24 and the recessed-cum-projecting section 26 in the axial direction is set narrower than a gap d2 between the ring gear 5 and each of the carrier plates 7A, 7B. The second embodiment is configured so that the above-mentioned recessed-cum-projecting section 26 fits with the recessed section 24 formed in the central section of the sun gear 4 and with the side wall sections 25 on both sides of the recessed section 24, and the above-mentioned gap d3 is set narrower than the gap d4.

Similarly to this, in the third embodiment, the recessed-cum-projecting section 26 is configured so as to fit with the recessed section 24 formed in the central section of the sun gear 4 and with the side wall sections 25 on both sides of said recessed section 24, and so as to fit with the recessed section 24 formed in the central section of the ring gear 5 and with the side wall sections 25 on both sides of said recessed section 24. Moreover, the gap d1 is set narrower than the gap d2, and the gap d3 is set narrower than the gap d4. In the fourth embodiment, the recessed-cum-projecting section 26 is configured so as to fit with the recessed section 24 formed in the central section of the mass increasing section 21 and with the side wall sections 25 on both sides of the recessed section 24 in the axial direction, and the gap d5 is set narrower than the gap d6. Thus, in the example shown in FIG. 16, the recessed section 24 and side wall sections 25 on both sides of said recessed section 24 and the recessed-cum-projecting section 26 are configured to serve as the holding section 20, and even such a configuration makes it possible for movement of the sun gear 4, the ring gear 5, and the mass increasing section 21 in the axial direction to be suppressed.

Note that the present disclosure is not limited to each of the above-mentioned embodiments, and that the planetary rotary unit in the present disclosure is not limited to being configured by a gear, and may be configured by a roller. In addition, the planetary rotary unit in the present disclosure may be provided on an inside of a torque converter or fluid coupling not having a torque amplifying action. Moreover, there may be a configuration whereby the axial centers of each of the above-mentioned rotary elements are held on the same axis by a self-lubricating slide bearing, instead of by the guide bearing of the above-mentioned configuration. Alternatively, there may be a configuration whereby the axial centers of each of the above-mentioned rotary elements are held on the same axis by a guide roller installed in a rotatable manner in the drive-side member 9 or driven-side member 10 of the spring damper 8. In short, all that is required is a configuration whereby each of the axial centers of fellow rotary elements rotating relatively to each other are held on the same axis.

What is claimed is:

1. A torsional vibration damper, comprising:
   a planetary rotary unit having a first rotary element, a second rotary element disposed concentrically to the first rotary element, a plurality of planetary rotary elements disposed between the first rotary element and the second rotary element in a radial direction of the first rotary element and engaging with at least any one of the first rotary element and the second rotary element, and a third rotary element holding the planetary rotary elements in a rotatable manner; and
   an elastic body coupling any two rotary elements of the first rotary element, the second rotary element, and the third rotary element so that the two rotary elements can rotate relatively to each other by a certain angle,
   and is configured so that a torque is applied to the two rotary elements, and so that due to a pulsation of the torque, the elastic body is elastically deformed whereby a relative rotation of the two rotary elements occurs, and the planetary rotary elements make a reciprocating movement in a circumferential direction by an angle based on the pulsation of the torque, and a pulsation occurs in rotation of the rotary element other than the planetary rotary elements and the two rotary elements, the torsional vibration damper comprising:
   a shaft supporting member by which a rotation center axis of at least any one rotary element of the two rotary elements and a rotation center axis of the rotary element other than the planetary rotary elements and the two rotary elements are held on the same axis,
   wherein the shaft supporting member is disposed in a position between fellow planetary rotary elements and not making contact with the planetary rotary elements when the planetary rotary elements make a reciprocating movement in the circumferential direction due to the pulsation of the torque, and
   wherein the shaft supporting member has a holding section that fits with the rotary element other than the planetary rotary elements and the two rotary elements so as to suppress movement of the rotary element other than the planetary rotary elements and the two rotary elements in an axial direction with respect to the at least any one rotary element of the two rotary elements, wherein
   the rotary element other than the planetary rotary elements and the two rotary elements serves the first rotary element,
   the two rotary elements serve as the second rotary element and the third rotary element,
   the shaft supporting member is provided to the third rotary element,
   the planetary rotary unit includes a planetary gear unit having a sun gear, a ring gear disposed concentrically to the sun gear, and a carrier that holds a plurality of pinion gears that engage with the sun gear and the ring gear,
   one of the of the sun gear and the ring gear serves as the first rotary element,
   the carrier serves as the third rotary element,
   other one of the sun gear and the ring gear, and the carrier serve as the two rotary elements, and
   the holding section is configured so as to fit from both sides in the axial direction with at least one set of teeth of teeth of the sun gear and teeth of the ring gear.

2. The torsional vibration damper as claimed in claim 1, wherein
   the holding section is configured so as to fit with the first rotary element from both sides in the axial direction, and
   a first gap between the holding section and the first rotary element in the axial direction is narrower than a second gap between the first rotary element fitted with the holding section and the third rotary element in the axial direction.

3. The torsional vibration damper as claimed in claim 2, wherein
   the planetary rotary unit includes a planetary gear unit having a sun gear, a ring gear disposed concentrically to the sun gear, and a carrier that holds a plurality of pinion gears that engage with the sun gear and the ring gear,
   one of the of the sun gear and the ring gear serves as the first rotary element,
   the carrier serves as the third rotary element, and
   other one of the sun gear and the ring gear, and the carrier serve as the two rotary elements.

4. The torsional vibration damper as claimed in claim 3, wherein the holding section is configured so as to fit from both sides in the axial direction with at least one set of teeth of teeth of the sun gear and teeth of the ring gear.

5. The torsional vibration damper as claimed in claim 3, wherein
   the sun gear serves as the first rotary element,
   the ring gear serves as the other gear,
   the shaft supporting member is provided to the carrier,
   a mass increasing section that increases an inertia mass of the sun gear is provided integrally with the sun gear in a position between fellow planetary rotary elements and not making contact with the planetary rotary elements when the planetary rotary elements make a reciprocating movement in the circumferential direction due to the pulsation of the torque, and
   the holding section is configured so as to fit with the mass increasing section.

6. The torsional vibration damper as claimed in claim 1, wherein
   the sun gear serves as the first rotary element,
   the ring gear serves as the other gear,
   the shaft supporting member is provided to the carrier,
   a mass increasing section that increases an inertia mass of the sun gear is provided integrally with the sun gear in a position between fellow planetary rotary elements and not making contact with the planetary rotary elements when the planetary rotary elements make a reciprocating movement in the circumferential direction due to the pulsation of the torque, and
   the holding section is configured so as to fit with the mass increasing section.

* * * * *